US012647429B2

(12) United States Patent
Jacobson et al.

(10) Patent No.: US 12,647,429 B2
(45) Date of Patent: Jun. 2, 2026

(54) PRIVACY-PRESERVING LOCATION ATTESTATION

(71) Applicant: GOOGLE LLC, Mountain View, CA (US)

(72) Inventors: Alex Jacobson, Mountain View, CA (US); Nicholas Sabatino, Mountain View, CA (US); Sudhi Herle, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/575,463

(22) PCT Filed: Dec. 17, 2021

(86) PCT No.: PCT/US2021/064088
§ 371 (c)(1),
(2) Date: Dec. 29, 2023

(87) PCT Pub. No.: WO2023/113819
PCT Pub. Date: Jun. 22, 2023

(65) Prior Publication Data
US 2024/0333725 A1 Oct. 3, 2024

(51) Int. Cl.
*H04L 9/40* (2022.01)
*G06F 9/54* (2006.01)

(52) U.S. Cl.
CPC ............ *H04L 63/107* (2013.01); *G06F 9/547* (2013.01)

(58) Field of Classification Search
CPC ... H04L 63/107; G06F 9/547; G06F 21/1013; G06F 21/6281; G06F 2221/2111; G06F 21/6245
See application file for complete search history.

(56) References Cited

U.S. PATENT DOCUMENTS

| | | | | |
|---|---|---|---|---|
| 8,473,729 | B2 * | 6/2013 | Trethewey | .............. G06F 21/60 455/404.2 |
| 8,880,047 | B2 * | 11/2014 | Konicek | ........... H04M 1/72457 455/445 |

(Continued)

FOREIGN PATENT DOCUMENTS

| | | |
|---|---|---|
| EP | 1 220 510 A2 | 7/2002 |
| EP | 3 863 318 A1 | 8/2021 |

(Continued)

OTHER PUBLICATIONS

Myles et al., Preserving Privacy in Environments with Location-Based Applications, IEEE, 2003.*

(Continued)

*Primary Examiner* — David Garcia Cervetti
(74) *Attorney, Agent, or Firm* — MARSHALL, GERSTEIN & BORUN LLP

(57) ABSTRACT

A non-transitory computer-readable medium stores instructions that implement an application programming interface (API). When invoked by a software entity executing on a computing device, the API is configured to receive, from the application, an indication of a geographic location (304); obtain, from an operating system of the computing device, an indication of a general geographic area associated with a home location of a user, wherein the operating system prevents the software entity from accessing the indication of the general geographic area (306); and provide, to the software entity, an indication of whether the geographic location is within the general geographic area (308).

16 Claims, 6 Drawing Sheets

(56) References Cited

U.S. PATENT DOCUMENTS

| | | | | |
|---|---|---|---|---|
| 9,253,198 | B2 * | 2/2016 | Hughes, Jr. | H04L 63/08 |
| 9,491,183 | B1 * | 11/2016 | Dippenaar | G06F 21/32 |
| 9,754,255 | B1 * | 9/2017 | Ma | G06Q 20/4014 |
| 9,832,648 | B2 * | 11/2017 | Vanderhulst | H04W 12/08 |
| 9,934,386 | B2 * | 4/2018 | Trethewey | G06F 21/6245 |
| 10,387,487 | B1 * | 8/2019 | Svendsen | G06F 16/9535 |
| 10,498,766 | B1 * | 12/2019 | Yu | H04L 63/20 |
| 10,555,178 | B1 | 2/2020 | Bach et al. | |
| 10,638,305 | B1 * | 4/2020 | Chu | H04W 12/02 |
| 10,929,443 | B2 * | 2/2021 | Grochocki, Jr. | G06F 16/29 |
| 10,999,299 | B2 | 5/2021 | Yang et al. | |
| 11,044,610 | B2 | 6/2021 | Korrapati et al. | |
| 11,146,537 | B1 * | 10/2021 | Kennedy | H04W 12/08 |
| 11,523,282 | B2 * | 12/2022 | Buck | H04L 63/20 |
| 2005/0060575 | A1 * | 3/2005 | Trethewey | H04W 12/02 726/4 |
| 2006/0136297 | A1 * | 6/2006 | Willis | G07F 17/32 705/14.58 |
| 2006/0266830 | A1 * | 11/2006 | Horozov | G06Q 30/02 235/386 |
| 2008/0165961 | A1 * | 7/2008 | Lerouge | H04N 21/4325 348/E7.056 |
| 2009/0323972 | A1 * | 12/2009 | Kohno | G06F 21/6245 380/284 |
| 2012/0203663 | A1 | 8/2012 | Sinclair et al. | |
| 2012/0276926 | A1 | 11/2012 | Pitt | |
| 2013/0081120 | A1 * | 3/2013 | DeLuca | H04L 63/083 726/7 |
| 2014/0045450 | A1 * | 2/2014 | Ballantyne | H04L 63/126 455/404.2 |
| 2014/0080457 | A1 * | 3/2014 | Agrawal | H04L 63/107 455/414.1 |
| 2014/0090023 | A1 * | 3/2014 | Hu | H04W 12/02 726/4 |
| 2014/0096215 | A1 * | 4/2014 | Hessler | H04W 12/06 726/7 |
| 2015/0067880 | A1 | 3/2015 | Ward et al. | |
| 2015/0358812 | A1 * | 12/2015 | Poiesz | H04W 4/023 455/411 |
| 2016/0117525 | A1 * | 4/2016 | Arunachalam | H04L 63/20 726/1 |
| 2017/0012996 | A1 * | 1/2017 | Hu | H04L 9/3242 |
| 2017/0026345 | A1 * | 1/2017 | Salek | H04W 12/033 |
| 2017/0195874 | A1 * | 7/2017 | DeLeeuw | H04W 12/04 |
| 2017/0244565 | A1 * | 8/2017 | Bronk | H04W 12/106 |
| 2017/0357425 | A1 * | 12/2017 | Smith | G06F 3/0482 |
| 2017/0359189 | A1 * | 12/2017 | Smith | G05B 15/02 |
| 2017/0359191 | A1 * | 12/2017 | Smith | G05B 15/02 |
| 2017/0359193 | A1 * | 12/2017 | Smith | H04L 12/4625 |
| 2018/0004747 | A1 * | 1/2018 | Smith | H04N 7/185 |
| 2018/0019986 | A1 * | 1/2018 | Manohar | H04W 12/06 |
| 2018/0091942 | A1 * | 3/2018 | Chakra | H04W 12/02 |
| 2018/0100742 | A1 * | 4/2018 | Greenwood | G06F 16/29 |
| 2018/0100747 | A1 * | 4/2018 | Greenwood | G01C 21/3694 |
| 2018/0109914 | A1 * | 4/2018 | Kernan | H04W 4/029 |
| 2018/0342869 | A1 * | 11/2018 | Zhang | H02J 3/381 |
| 2019/0005224 | A1 * | 1/2019 | Oliver | G06F 21/44 |
| 2019/0041223 | A1 | 2/2019 | Yang et al. | |
| 2020/0120480 | A1 * | 4/2020 | Chu | H04W 4/02 |
| 2020/0304993 | A1 * | 9/2020 | Connell | H04W 8/16 |
| 2020/0382912 | A1 * | 12/2020 | Dancie | H04W 4/02 |
| 2020/0410798 | A1 * | 12/2020 | Raduchel | G07C 9/22 |
| 2021/0132179 | A1 | 5/2021 | Jones et al. | |
| 2021/0243595 | A1 * | 8/2021 | Buck | G06F 21/604 |
| 2021/0400624 | A1 * | 12/2021 | Driscoll | H04W 12/37 |
| 2022/0108575 | A1 * | 4/2022 | Raduchel | G06Q 50/26 |
| 2022/0141041 | A1 * | 5/2022 | Parikh | G06F 21/44 713/156 |
| 2023/0118306 | A1 * | 4/2023 | Kotsogiannis | G06Q 50/01 726/26 |
| 2023/0185939 | A1 * | 6/2023 | Cam-Winget | G06F 21/123 726/1 |
| 2023/0254305 | A1 * | 8/2023 | Miel | H04W 12/63 455/411 |
| 2023/0315277 | A1 * | 10/2023 | Sun | G06F 21/6218 715/765 |
| 2024/0259428 | A1 * | 8/2024 | Verma | H04L 61/4588 |
| 2024/0333725 | A1 * | 10/2024 | Jacobson | G06F 9/547 |
| 2025/0260565 | A1 * | 8/2025 | Abdelsamie | H04L 9/3239 |

FOREIGN PATENT DOCUMENTS

| | | | | |
|---|---|---|---|---|
| JP | H05-241810 | A | 9/1993 | |
| JP | 2011-512574 | A | 4/2011 | |
| JP | 2016-004307 | A | 1/2016 | |
| JP | 2021-008756 | A | 1/2021 | |
| KR | 102851435 | B1 * | 8/2025 | H04W 64/00 |
| WO | WO-2018201109 | A1 | 11/2018 | |

OTHER PUBLICATIONS

Arunkumar et al., Location attestation and access control for mobile devices using GeoXACML, Nov. 2016, Elsevier.*

Vila Tena et al., Privacy challenges of open APIs: case Location Based Services, IEEE, 2011.*

Zhu et al., Applaus: A Privacy-Preserving Location Proof Updating System for Location-based Services, IEEE, 2011.*

Xie et al., A Unified Location Sharing Service With End User Privacy Control, Bell Labs Journal, 2011.*

Canlar et al., Crepuscolo: a Collusion Resistant Privacy Preserving Location Verification System, IEEE, 2013.*

Japanese Patent Application No. 2024-525902, Notice of Refusal, dated Apr. 8, 2025.

International Search Report and Written Opinion for Application No. PCT/US2021/064088, dated Aug. 8, 2022.

* cited by examiner

200

300

800

DETERMINE THE HOME LOCATION OF THE PORTABLE DEVICE ~802

STORE AN INDICATION OF THE HOME LOCATION IN A PRIVILEGED REGION OF THE MEMORY ~804

ALLOW AN API TO ACCESS THE INDICATION IN THE PRIVILEGED REGION OF THE MEMORY ~806

PREVENT OTHER SOFTWARE ENTITIES FROM ACCESSING THE INDICATION IN THE PRIVILEGED REGION OF THE MEMORY ~808

PRIVACY-PRESERVING LOCATION ATTESTATION

FIELD OF THE DISCLOSURE

This disclosure relates to location verification and, more particularly, to an application programming interface for verifying whether the home location of a user corresponds to a certain geographic area, without revealing the user's home location.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Certain services with which a user device can interact apply location-based restrictions and, more generally, modify the content or presentation of the content depending on the current location of the user device. For example, music streaming and download services often restrict access to digital catalogs of music based on the country from which requests for content arrive. Online video streaming services impose similar restrictions.

Further, providers of targeted digital advertisements (or "ads") often adjust content, presentation format, presentation frequency, etc. based on the location of devices where the content is presented. Advertisers also can use advertisement syndication, which allows advertisers to extend their marketing reach by distributing advertisements to additional partner such as third-party online publishers that place an advertiser's text or image advertisements on web pages that have content related to the advertisement. Advertisers can bid for placements based upon how much the advertiser values the placement. The bids can be based upon certain aspects of the impression of the advertisement, including the click-through rates for the advertisement, and the geographic location where the advertisement is provided.

A user in some case sets up a virtual private network (VPN), so that the computing device acquires an Internet Protocol (IP) address of a remote network, often in another country. In this manner, a user currently located in country A and allowed to access certain content only in country B can make the computing device appear to operate in country B and thus gain access to location-restricted content. Today, certain bad actors use VPN to masquerade users from a country where advertisers pay a relatively low price for presentation of content as users from another country where advertisers pay a relatively high price for presentation of content. Although it is possible, in some cases, for a portable device to directly indicate to applications or scripts what the location of the user is, doing so would significantly reduce the level of privacy the user enjoys. On the other hand, restricting users' ability to set up VPN connections would interfere with various legitimate VPN-based services.

SUMMARY

An application programming interface (API) of this disclosure allows an application executing on a portable device to determine whether a certain geographic location is associated with the home location of the portable device, without compromising privacy or interfering with VPN functionality.

An example embodiment of these techniques is a non-transitory computer-readable medium storing thereon instructions that implement an application programming interface (API) which, when invoked by a software entity executing on a computing device, is configured to receive, from the application, an indication of a geographic location; obtain, from an operating system of the computing device, an indication of a general geographic area associated with a home location of a user, wherein the operating system prevents the software entity from accessing the indication of the general geographic area; and provide, to the software entity, an indication of whether the geographic location is within the general geographic area.

Another example embodiment of these techniques is a method implemented in an operating system of a portable device. The method includes determining a general geographic area associated with a home location of the portable device; storing an indication of the general geographic area in a privileged region of a memory of the portable device; and restricting access to the indication. The restricting includes preventing software application executing on the portable device from accessing the indication, and granting access to the indication to an API exposed to the software application and configured to operate on the indication without revealing the indication to the software application.

Yet another example embodiment of these techniques is a portable device comprising one or more processors and a non-transitory computer-readable memory. The memory stores instructions executable on the one or more processors to implement the method above.

DETAILED DESCRIPTION OF THE DRAWINGS

Generally speaking, an API of this disclosure allows an application executing on a portable device to determine whether a certain geographic location is associated with the home location of the portable device. The geographic location which the application indicates to the API can be an estimate of the current geographic location of the portable device. The API compares the indicated geographic location to an indication of the home location stored in a memory region inaccessible to the application. By not revealing the home location to the application, the API provides improved protection of the user's privacy.

Figure 1:
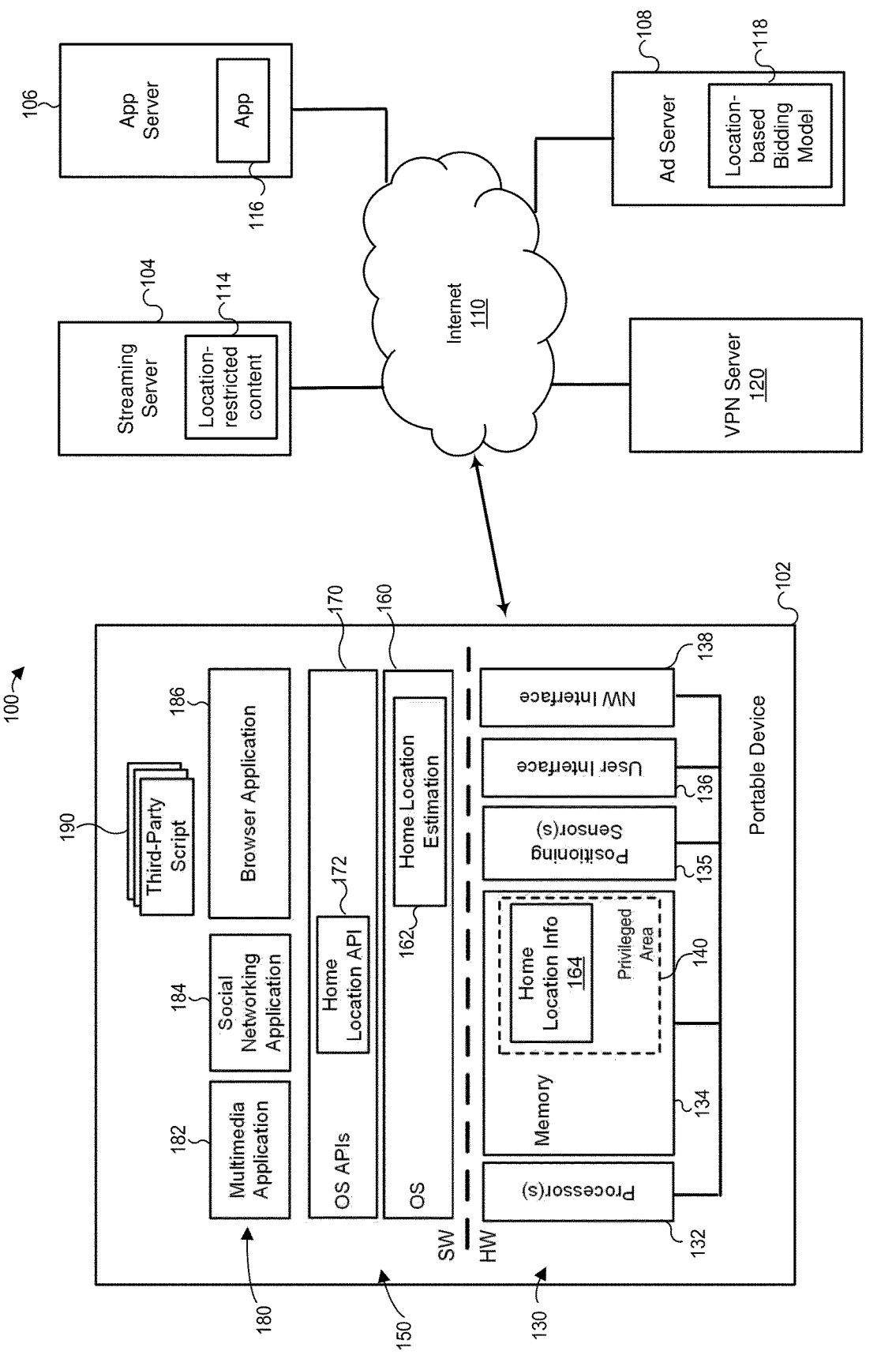
FIG. 1 is a block diagram of an example computing environment and a portable device that implements techniques of this disclosure for providing location attestation without compromising user privacy.

Referring first to FIG. 1, these techniques can be implemented in an example portable computing device (or simply "portable device") 102 such be a smartphone, a laptop computer, a tablet computer, a smart watch, or any other general-purpose or special-purpose computing device. The portable device 102 operates in an environment 100 and can access, via a wide area network such as the Internet 110, location-restricted content 114 from a streaming server 104 and an application 116 from an application server 106, for example. Further, an advertisement ("ad") server 108 can interact with the portable device 102 as well as with the servers 104 and 106 provide advertisement in various formats (static images, interactive banners, audio segments, video segments, etc.) to the portable device 102. The ad server 108 can use a location-based bidding model 118 to determine minimum bidding amounts and pricing adjustment for ads based on geography.

In some cases, the portable device can operate in a virtual private network (VPN) by tunneling data via a VPN server 120. As discussed in more detail with reference to FIG. 7, the VPN server 120 can present an IP address to servers from which the portable device 102 requests content, such as the streaming server 104, the application server 106, and the ad server 108.

The hardware 130 of the portable device 102 includes one or more processors 132, a non-transitory memory 134 readable by the processor(s) 132, one or more positioning sensors 135, a user interface 136, and a network interface 138. The processor(s) 132 can include one or more central processing units (CPUs), one or more graphics processing units (GPUs), special-purpose hardware, etc. The memory 134, which can include any suitable non-transitory storage readable by the processor(s) 132, includes a privileged region or area 140 accessible to certain software components of the portable device 102 but inaccessible to other software components, such as third-party applications a user may install on the portable device 102 or various third-party scripts and programs executed by native applications running on the portable device 102. The positioning sensors 135 can include a Global Positioning Services (GPS) module. The OS 160 also can determine the position of the portable device 102, or augment the readings of the GPS module, using the wireless local area network (WLAN) interface, a wireless personal area network (WPAN) interface, and other radio components operating as parts of the network interface 138. The user interface 136 can include a touchscreen, a microphone, a speaker, and other suitable input and/or output devices.

The software 150 of the portable device 102 includes an operating system (OS) 160 and an OS API layer 170. Collectively, the hardware 130 along with the OS 160 and the OS API layer 170 define a platform on which various native and non-native (e.g., third-party) applications can execute. In addition to standard OS-level functionality, the OS 160 of this disclosure can include a home location estimation module 162 that, in operation, determines the home location of the portable device 102 and stores the determined home location information in a field 164 within the privileged area 140. The OS API layer 170 includes a home location API 172 which can access the field 164. Various software applications, programs, scripts executing in other applications (more generally, "software entities") can invoke the home location API 172 to check whether a certain location is associated with the home location, but cannot access the privileged area 140 in general and the home location information 164 in particular.

In some implementations, the home location estimation module 162 operates as a background task or a daemon for example, to periodically access the positioning sensors 135 and estimate and/or update the home location information in the field 164. The home location estimation module 162 alternatively can operate as a component of the home location API 172, which software entities invoking the API 172 cannot directly access.

With continued reference to FIG. 1, the application layer 180 can include a multimedia application 180, a social network application 184, and a browser application 186, for example. The application layer 180 in general can include any number of applications. In this example configuration, the multimedia application 180 and the social network application 184 are non-native, third-party applications developed by different respective third-party developers and adapted for the OS 160. The browser application 186 in the example of FIG. 1 is a native application developed specifically for the OS 160. However, the browser application 186 can execute third-party scripts 190 which may be allowed to access some of the functionality of the OS 160 and the OS API layer 170.

Figure 2:
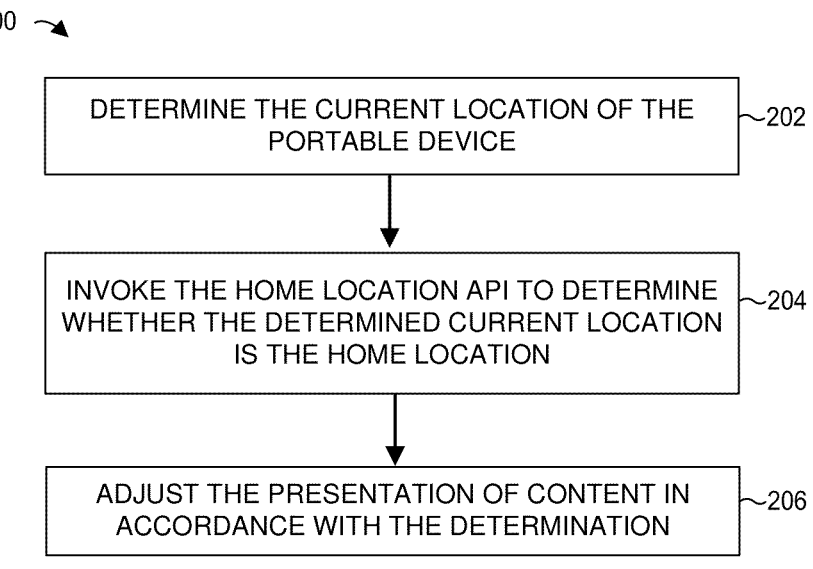
FIG. 2 is a flow diagram of an example method for using the home location API to determine whether the determined location of the portable device is the home location of the portable device, which can be implemented in a third-party application.

Now referring to FIG. 2, a method 200 can be implemented in a third-party application such as the multimedia application 182. The method 200 begins at block 202, where the third-party application determines the current location of the portable device 102. To this end, the application can access the positioning sensor(s) 135, when the user of the portable device 102 grants the application permission to access these sensors or the current location information stored by the OS 160. In other cases, the application at block 202 determines the location of the portable device 102 based on the IP address, user input received directly via a form, referrer information, or another suitable source.

At block 204, the application invokes the home location API 172 and provides an indication of a geographic location, which can be the location determined at block 202. For example, the home location API 172 can include a function with a format isHome Location(inputLocation), which returns true if the specified location corresponds to the home location of the portable device 102, and false otherwise. The home location API 172 does not expose the home location stored in the field 164 regardless of the result of executing the function. In this manner, the home location API 172 protects the user's privacy.

As further discussed below with reference to FIG. 3, the home location API 172 can support any desirable level of granularity (or coarseness). Thus, for example, the application can specify the location as a set of GPS coordinates, and the home location API 172 returns true if the GPS coordinates are within the boundaries of the home country of the portable device 102. As another example, the application can determine the IP address of the portable device 102 and specify the town or city where the Internet Service Provider (ISP) of the internet address is registered, and the home location API 172 returns true if the town or city is in the home country of the portable device 102.

For some of the implementations of the home location API 172, the interface includes an indication of granularity, e.g., isHome Location(inputLocation, granularityLevel), where granularityLevel can be one of the predefined value in a predefined set such as {"Continent", "Country", "State", "City"}. The granularityLevel parameter alternatively can be a measurement of the desired radius of accuracy, e.g., "100 miles."

At block 206, the application adjusts the presentation of content in accordance with the output of the home location API 172 received at block 204. For example, the application can be a subscription-based movie streaming service, and the application disables playback and displays the error message "Sorry but you are not in your home location" when the home location API 172 returns false at block 204. As another example, the application can provide the tuple (current country, "traveling") or (current country, "home") to the ad server 108, which can adjust ad content for display on the portable device 102.

Figure 3:
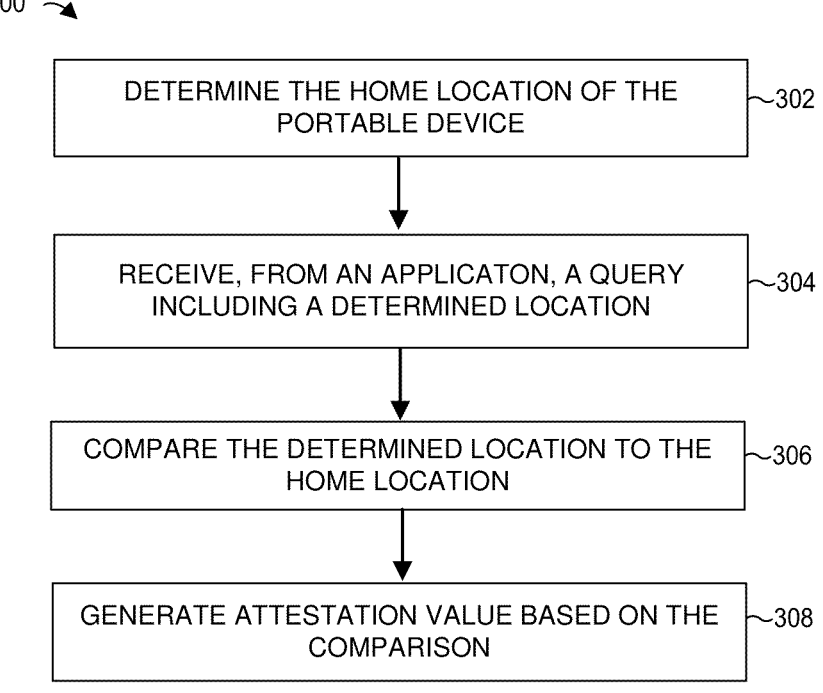
FIG. 3 is a method for determining whether an indication location is the home location of the portable device, which can be implemented in the API of this disclosure.

FIG. 3 illustrates an example method 300 that can be implemented a suitable API such as the home location API 172. At block 302, the API determines the home location of the portable device and stores the determined home location in the privileged area 140 of the memory 134. In some implementations, the home location estimation module 162 uses multiple readings of the positioning sensor(s) 134 to estimate the home location. For example, the home location estimation module 162 can collect N samples of M days and calculate the geographic average. The home location estimation module 162 can perform the collection and the estimation periodically, e.g., every 12 hours, every 24 hours, or every 72 hours.

The sensor data can include GPS coordinates, IP address information of the portable device 102, the IP address of the access point (AP) of the WLAN in which the portable device 102 operates, etc. As another example, the API can collect the samples during the night because the user is more likely to be home at that time. The user according to at least some of the implementations of the API indicates that the API is allowed to acquire this data by operating certain controls or installing certain software. In yet other implementations, the API explicitly queries the user regarding the home location.

The API can store the home location as the home location information 164, at any desired level of granularity. In various implementations, the API can store the home location at the level of a continent (e.g., "Asia," "North America"), a large geographic region (e.g., "Eastern Europe," "Northern Africa"), a country (e.g., "Japan," "France"), a state (e.g., "Bihar," "Alabama"), or a city or town (e.g., "London," "San Francisco"). In other implementations, the API stores the home location as an S2 cell or a set of S2 cells, which are projections of the Earth's spherical surface onto a two-dimensional system of coordinates, at any suitable zoom level. Moreover, the API in some cases can store the home location as a set of GPS coordinates.

Next, at block 304, the API receives a query indicating the estimated current location of the portable device 102 and, in some implementations, the desired level of granularity (see the discussion of block 204 above). As discussed above, the API can be exposed to a variety of third-party applications, scripts, or other software entities.

At block 306, the API compares the location received at block 304 to the home location. To this end, the API can obtain an indication of a general geographic area associated with the home location information 164. For example, the home location information 164 can store an indication of a city, and the application can invoke the API with the level of granularity set to "country." The API can use any suitable technique such as converting both locations into S2 cells and traversing an S2 cell tree to determine whether the S2 cell of the determined location is within the S2 cell of the home location. Then, at block 308, the API generates an attestation value such as true or false based on the comparison.

Although the API in this example implementation is configured specifically to compare the location specified by a software entity to the home location stored in the privileged area of the memory, the API in general can be configured to perform a certain suitable operation on the home location stored in the privileged area of the memory, without revealing the home location to the entity invoking the API.

In some implementations, the API prevents the software entity from frequently invoking the API within a certain predetermined period of time in an attempt to iterate through a large number of possibilities and thereby determine the home location. For example, the API can limit the number of times the software entity invokes the API per day or impose a lock-out period after returning false. In some implementations, the API returns an error code in response to determining that the software entity invoked the API more than N times (e.g., three, five) during a predetermined period of time (e.g., 12 hours, 24 hours).

For further clarity, several example scenarios in which an application invokes the home location 172 are discussed next with reference to FIGS. 4-7.

Figures 4, 5:
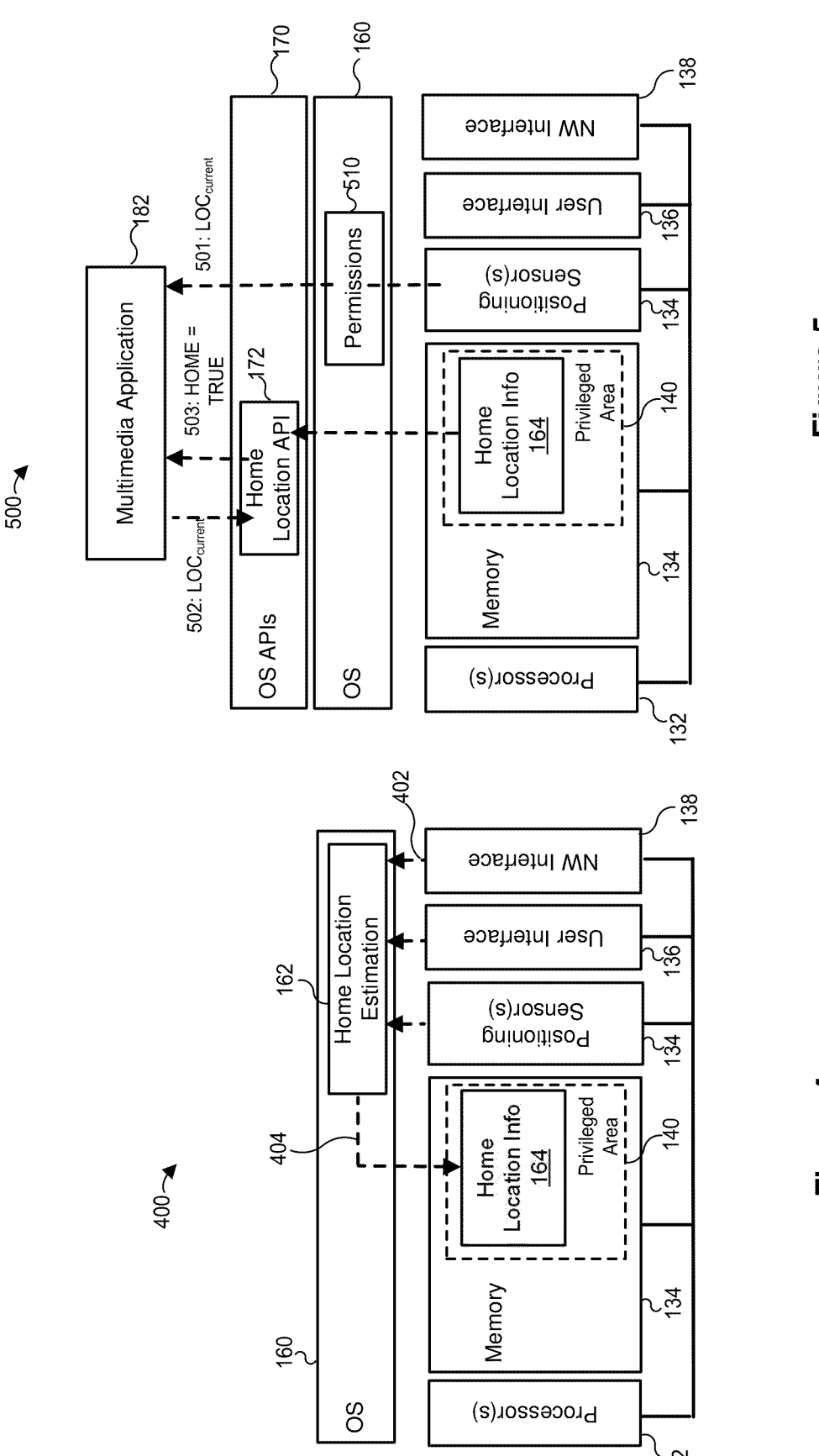
FIG. 4 schematically illustrates how the home location estimation module of FIG. 1 populates the home location information field in the privileged region of the memory.
FIG. 5 schematically illustrates how a multimedia application uses the home location API of this disclosure to determine whether the multimedia application should provide certain location-restricted content via the user interface of the portable device.

Referring first to FIG. 4, the home location estimation module 162 in a scenario 400 can obtain one or more readings 402 from one or more of the positioning sensors 135, the user interface 136, or the network interface 138. In one such scenario, the home location estimation module 162 obtains multiple GPS readings from the positioning sensors 134 during a certain period of time, clusters the readings, and determines the geometric center of the largest cluster. The home location estimation module 162 then determines an S2 cell at a low level of granularity (e.g., country) and stores 404 the determined the name of the country corresponding to the relatively coarse S2 cell in the field 164. In another scenario, the location estimation module 162 obtains, over a certain period of time, multiple readings of the IP address assigned to the network interface 138, and determines a relatively coarse S2 cell as discussed above. In still another example scenario, the home location estimation module 162 prompts the user via the user interface 136 and stores 404 the specified country in the field 164. The home location estimation module 162 also can implement any suitable combination of these techniques.

Next, FIG. 5 schematically illustrates an example scenario 500 in which a multimedia application 182 uses the home location API 172 to determine whether the multimedia application 182 should enable playback of certain content. The multimedia application 182 in this case can be restricted to providing streaming media only if the user is currently in their home country.

Operation 501 corresponds to the multimedia application 182 determining the current location of the portable device 102 by obtaining, subject to user permissions 510, readings from the positioning sensor(s) 134. More specifically, the OS 160 may require that the user explicitly allow the multimedia application 182 to access the current location $LOC_{current}$ prior to granting the multimedia application 182 access to the positioning sensor(s) 134. The OS 160 can ascertain the permissions 510 upon installation or at runtime of the multimedia application 182, for example.

The multimedia application 182 the provides 502 the determined location $LOC_{current}$ to the home location API 172. In turn, the home location API 172 obtains the home location information from the field 164. The multimedia application 182 in this example scenario returns 503 the value "true" to the multimedia application 182 to indicate that the portable device 102 current operates in its home location. The multimedia application 182 accordingly enables playback.

Figure 6:
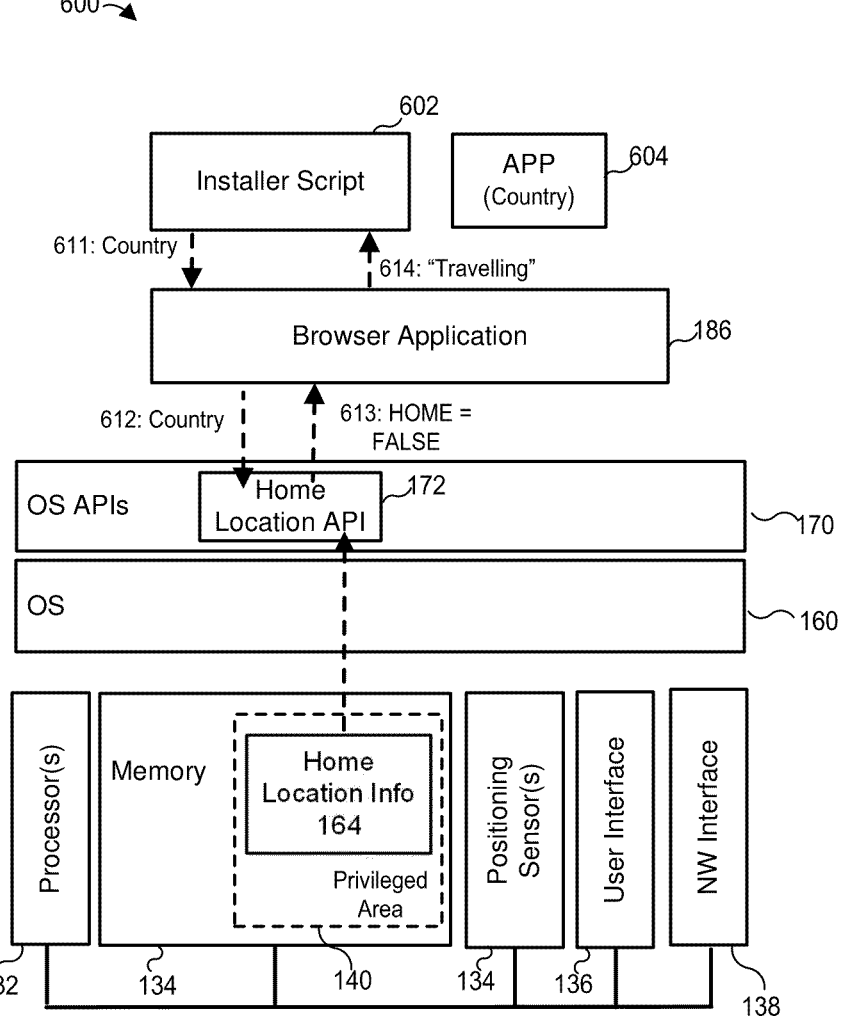
FIG. 6 schematically illustrates how an installer script uses the home location API of this disclosure to provide an indication of whether the user installing a certain application is currently traveling.

FIG. 6 schematically illustrates how an installer script 602 in a scenario 600 uses the home location API 172 to provide an indication of whether the user installing a certain application 604 is in their home country or is currently travelling. Certain providers of content can value installations differently depending on whether the user is a visitor to the country, and the installer script 602 reports, to a provider of the application 604 or another third party, whether the installation occurred in the home country of the portable device 120. As a more specific example, the installer script 602 can report to a provider of the application 604 a tuple {US, home} or {US, travelling} depending on whether the portable device 120 belongs to a user who resides in the US or is visiting the US, respectively.

In a generally similar manner, a provider of advertisements can value impressions (or instances where an advertisement is displayed via a user interface) in a certain country differently depending on whether the user operating the portable device 120 resides in the country or is visiting the country. A script generally similar to the installer script 602 can report, to an advertisement server for a certain campaign, a tuple such as {Japan, traveling} or {India, home}. The advertisement server can use this information to run different auctions (e.g., specify different bid amounts) for {country, home} and {country, traveling} situations.

As illustrated in FIG. 6, the installer script 602 executes in the environment of the browser application 186. More particularly, the installer script 602 can include instructions in a scripting language such as Javascript executable by the browser application 186. The installer script 611 provides the country indication (e.g., "the US") to the browser application 186, which then invokes 612 the home location API 172 with the country indication. In this example scenario, the home location 172 returns "false," and the browser application reports 614 to the installer script 602 that the user is travelling in the specified country.

Figure 7:
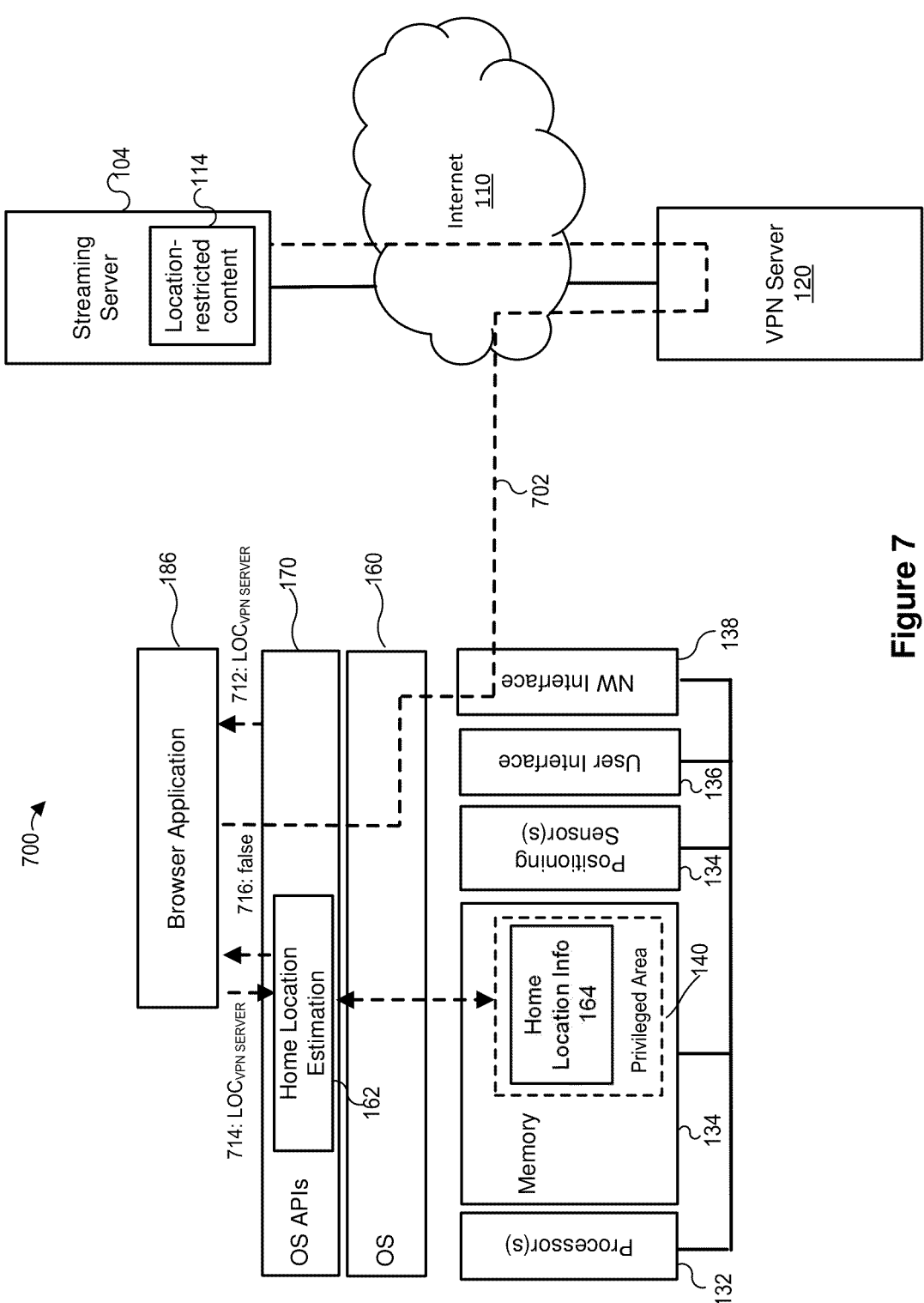
FIG. 7 schematically illustrates how a web browser using the home location API of this disclosure when the portable device communicates with online services using a VPN.

Next, FIG. 7 schematically illustrates how a browser application 186 can use the home location API 162 when accessing the location-restricted content 114. The user in this case has set up a VPN connection with the streaming server 104, via the VPN server 120. Traffic between the portable device 102 and the server 104 accordingly travels 702 via the VPN server or host 120. As a result, the browser application 186 and/or software components operating within the environment of the browser application 186 (e.g., HyperText Markup Language (HTML) instructions, plug-ins and scripts, instructions executing on virtual platforms) can determine 712 that the current location of the portable device is the location $LOC_{VPN\ Server}$ of the VPN server 120, which may operate in a different country or continent than the portable device 102. When the streaming server 104 restricts access to the content 114 to a particular country, the user may select the VPN server 120 that operates in this country, and thus gain access to the restricted content.

The browser application 186 invokes 714 the home location API 162 with $LOC_{VPN\ Server}$ as a parameter. The home location API 162 returns 716 "false" in this example scenario because the location stored in the field 164 does not correspond to the indicated location. In some scenarios, the streaming server 104 can provide a software component along with the location-restricted content 114. After the home location API 162 returns "false," the software component can provide an error message such as "this content cannot be played in your region." Alternatively, the browser application 186 can provide the result of invoking the home location API 162 to the streaming server 104, and the streaming server 102 can provide the error message in the streaming format of the location-restricted content 114.

Figure 8:
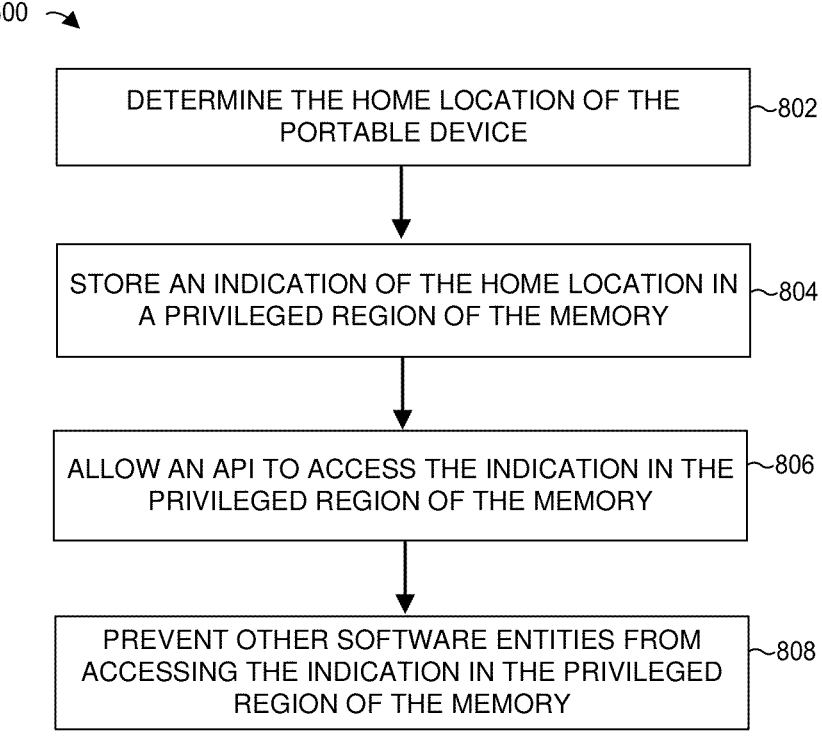
FIG. 8 is a flow diagram of an example method for supporting location attestation while preserving privacy, which can be implemented in an operating system of a portable device.

Finally, FIG. 8 illustrates an example method 800 which an operating system, such as the OS 160, can implement to support location attestation functionality. At block 802, the operating system determines the home location of the portable device. As discussed above with reference to block 302 of FIG. 3, a component of the OS such as the home location estimation module 162 can use one or more readings from the positioning sensor(s) 134, the user interface 136, and/or the network interface 138.

At block 804, the operating system stores an indication of the determined home location in a privileged region of the memory such as the field 164. The operating system can store the indication at any desired level of coarseness. Next, at blocks 806 and 808, the operating system restricts selectively access to the stored indication. In particular, the operating system granting only certain software entities (e.g., the home location API 172) read access to the indication (block 806), and preventing other software entities (e.g., the multimedia application 182, the social network application 184, the browser application 186, the third-party script 190) from accessing the indication (block 808). In this manner, the operating system requires that software entities access the stored indication of the home location only indirectly, and only via the home location API 172.

The following additional considerations apply to the foregoing discussion.

Certain embodiments are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

What is claimed is:

1. A non-transitory computer-readable medium storing thereon instructions that implement an application programming interface (API) on a portable device which, when invoked by a software application executing on the portable device, is configured to:

receive, from the software application, an indication of a current geographic location of the portable device;

obtain, from an operating system of the portable device, an indication of a general geographic area including a home location of the portable device, wherein the operating system prevents the software application from accessing the indication of the general geographic area; and provide, to the software application, an indication of whether the current geographic location is within the general geographic area.

2. The non-transitory computer-readable medium of claim 1, wherein to obtain the indication of the general geographic area, the API is configured to access a privileged region of a memory of the portable device, wherein the privileged region of the memory is inaccessible to the software application.

3. The non-transitory computer-readable medium of claim 1, wherein the general geographic area is determined based on periodic readings of one or more sensors of the portable device.

4. The non-transitory computer-readable medium of claim 1, wherein the general geographic area is received from a user via a user interface of the portable device.

5. The non-transitory computer-readable medium of claim 1, wherein the API is further configured to:

receive, from the software application, a level of desired coarseness of the general geographic location, and wherein the API compares the current geographic location to the general geographic area according to the level of coarseness.

6. The non-transitory computer-readable medium of claim 5, wherein the level of coarseness corresponds to one of country or continent.

7. The non-transitory computer-readable medium of claim 1, wherein the API is further configured:

determine an S2 cell based on the indication of the current geographic location; and provide the indication that the current geographic location is within the general geographic area if the determined S2 cell is within, or coincides with, an S2 cell corresponding to the general geographic area including the home location of the portable device.

8. The non-transitory computer-readable medium of claim 1, wherein the API is further configured to:

return an error code in response to determining that the software application invoked the API more than N times during a predetermined period of time.

9. The non-transitory computer-readable medium of claim 1 wherein the software application is a non-native software application configured to execute the operating system of the portable device.

10. The non-transitory computer-readable medium of claim 1, wherein the software application is a script configured to execute in a native browsing application on the portable device.

11. A method implemented in an operating system of a portable device, the method comprising:

determining, by one or more processors, a general geographic area including a home location of the portable device;

storing, by the one or more processors, an indication of the general geographic area in a privileged region of a memory of the portable device; and restricting, by the one or more processors, access to the indication, including:

preventing, by the one or more processors, software application executing on the portable device from accessing the indication of the general geographic area, and granting, by the one or more processors, access to the indication to an API exposed to the software application and configured to operate on the indication without revealing the indication to the software application.

12. The method of claim 11, wherein determining the general geographic area includes performing periodic readings of one or more sensors of the portable device.

13. The method of claim 11, wherein determining the general geographic area includes performing receiving an indication of the general geographic area via a user interface of the portable device.

14. A portable device comprising:

one or more processors;

a non-transitory computer-readable medium storing instructions which, when executed by the one or more processors, cause the portable device to:

determine a general geographic area including a home location of the portable device;

store an indication of the general geographic area in a privileged region of a memory of the portable device; and restrict access to the indication, including:

preventing software application executing on the portable device from accessing the indication of the general geographic area, and granting access to the indication to an API exposed to the software application and configured to operate on the indication without revealing the indication to the software application.

15. The portable device of claim 14, wherein determining the general geographic area includes performing periodic readings of one or more sensors of the portable device.

16. The portable device of claim 14, wherein determining the general geographic area includes performing receiving an indication of the general geographic area via a user interface of the portable device.

* * * * *